(No Model.)
W. H. KNIGHT.
COMPOUNDING DYNAMO ELECTRIC MACHINES.
No. 509,475. Patented Nov. 28, 1893.
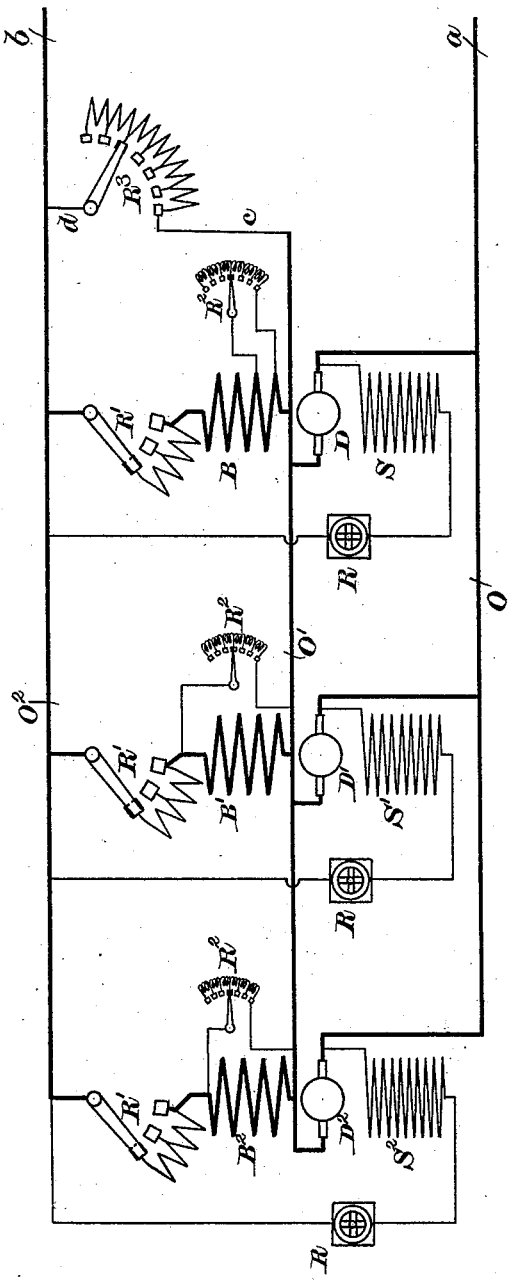
Witnesses.
Alec F. Macdonald.
A. C. Orne.
Inventor.
Walter H. Knight.
By Bentley & Blodgett
Attys.

UNITED STATES PATENT OFFICE.

WALTER H. KNIGHT, OF LYNN, ASSIGNOR TO THE GENERAL ELECTRIC COMPANY, OF BOSTON, MASSACHUSETTS.

COMPOUNDING DYNAMO-ELECTRIC MACHINES.

SPECIFICATION forming part of Letters Patent No. 509,475, dated November 28, 1893.

Application filed February 6, 1893. Serial No. 461,172. (No model.)

*To all whom it may concern:*

Be it known that I, WALTER H. KNIGHT, a citizen of the United States, residing at Lynn, county of Essex, and State of Massachusetts, have invented certain new and useful Improvements in Compounding Dynamo-Electric Machines, of which the following is a specification.

My invention comprises a new method of compounding dynamo electric machines when a number of such machines are used to feed the same work circuit in multiple, so that the delivered current is kept at constant potential as the load increases, or may increase or diminish in potential as the load increases if desired, while the proper division of the load between the several machines is maintained throughout the variations of service.

The invention comprises a method for accomplishing the individual regulation of dynamo electric machines connected in multiple circuit without affecting the regulation of the other machines, and it includes also a method of regulating all the machines simultaneously in accordance with the demands of the work circuit, as will be hereinafter described.

The invention is especially applicable to the case where a number of dynamo generators feeding the same work in multiple are provided with the equalizing connection described in a patent to E. W. Rice, Jr., No. 328,253, dated October 13, 1885. In the equalizing connection arrangement of the Rice patent, above referred to, the main current of each machine is able to flow in multiple through the series field coils of all the machines and divides through the series coils of the machines in accordance with their respective resistances. In such an arrangement of dynamos it is found that a variation of a resistance in series with the series field coil of one machine will interfere with the proper compounding of the other machines in multiple circuit therewith because this change of resistance occurs in what is an alternative path around the series field coils of such other machines, current being diverted from the series field coils of such other machines if the resistance in the alternative circuit is diminished, and current in such series field coils increasing if the resistance of such alternative circuit is increased.

The invention consists in an arrangement whereby the current flowing through the series coil of a dynamo in multiple connection with other dynamos, and provided with the equalizing connection above referred to, may be increased or diminished to vary its compounding effect upon such dynamo without varying the resistance of the circuit containing such series coil between the equalizing connection and the opposite wire of the circuit to which the series coils are each connected.

The invention likewise comprises an arrangement for varying the compounding action of all the machines simultaneously, and to a like extent in accordance as the conditions of load, &c., may demand.

The invention will be understood by reference to the drawings which represents in diagram the circuits of three compound dynamos connected in multiple and provided with my improvements.

D, D' and D² represent three compound wound electric generators whose shunt field coils are indicated at S, S' and S² and whose series coils or compounding coils are represented at B, B' and B², respectively. Rheostats R, R, R, in the shunt field circuits permit the regulation of current flow therein as usual. In series with each of the coils B, B' and B² are rheostats R', R', R'. In shunt relation to the coils B, B' and B² or in shunt relation to a portion of such coils, are other rheostats R², R², R², respectively. In a derived circuit around the coils B, B', and B² is a circuit $c\ d$ including a rheostat R³. One pole of each machine connects to the omnibus wire O. The other pole of each machine connects to the omnibus wire O² through the series field coils. An equalizing connection O' connects all of the series field coils in multiple, as shown in the Rice patent above referred to. Assuming that the machines D and D² were properly compounded with the apparatus in position shown, and the machine D' required more current in its series field coils B' to properly compound it, if the resistance R' were diminished it would be found that the current would be diverted from the series field coils B and B² of the machines D and D², which current would flow through the coil B' to the omnibus wire O² by way of the equalizing connection O'. It would therefore be necessary to adjust the rheostats R' of the machines D and D² every time the rheostat R' of the machine D was changed, and in fact the operator would be required to make a large number of adjustments of the rheostats R' passing from one machine to another to balance the compounding accurately. It is evident that the necessity for such a large number of adjustments has been occasioned by changing the resistance of the circuit B' R' of the machine D', and that if the amount of current flowing through the coil B' could be varied without changing the resistance from O' to O², no such difficulty of adjustment as has been mentioned would be experienced. This result is in fact accomplished by using an accessory resistance R² placed in shunt around the series coil B', B², or in shunt around a portion of such series coil, as around coil B. Now, if when the resistance R' has been diminished, the resistance R² is increased to a like extent, then the resistance between the equalizing connection O' and O² will have been unchanged, but it is evident that the current flowing through the coil B' will have been altered. In the same manner, suppose it were required to decrease the compounding current flowing through the coil B of the machine D, then the resistance R² in shunt around a portion of the coil B would be diminished, and the current would be diverted through R². But this would result in a decrease of resistance between O' and O² which would disturb the proper compounding of the machines D' and D² by diverting current therefrom. This effect is prevented by increasing the resistance R' of the machine D just as much as R² had been diminished, and by this means the compounding effect of the series coil B may be increased or diminished, while the effect on the machines D' and D² is *nil*. To afford a quick adjustment of all the machines D, D' and D², to a like extent, a rheostat R³ is provided in a circuit *c d* connecting O' and O². In case of a very heavy load or short circuit existing on the external circuit connected to the point *a b*, the attendant would increase the resistance R³, diverting current from all of the coils B, B' and B² to prevent an over-compounding action.

It is manifest that the method herein set out may be applied to the regulation of coils other than those of a dynamo electric machine, where such regulation is desirable. As I believe this method to be new, I wish to claim broadly any means of varying the compounding effect of the coil while maintaining the resistance constant, thus making the resistance constant in amount but variable in distribution, as herein explained.

What I claim as new, and desire to secure by Letters Patent, is—

1. The method of adjusting an electric coil, which consists in varying the compounding effect of the coil while maintaining a constant resistance between its terminals.

2. The method herein set out, of adjusting compound dynamo electric machines, which consists in maintaining a substantially constant resistance in circuit with the series coil beween the brush and line, while varying the current passing through the series coil.

3. The method herein set out, of adjusting compound dynamo electric machines connected in multiple, which consists in maintaining a substantially constant resistance in circuit with the series coil between the omnibus wire and the equalizing conductor, while varying the current passing through the series coil.

4. The method herein set out of adjusting compound dynamo electric machines connected in multiple, which consists in maintaining a resistance constant in amount but variable in distribution in circuit with the series coil between the omnibus wire and the equalizing connection, while varying the current passing through the series coil; thus permitting the independent adjustment of one of the machines in multiple while allowing the others to run undisturbed.

5. The method of individually regulating the compounding effect of the series coils of a number of dynamo electric generators feeding the same work circuit in multiple, and connected as described, consisting in separately varying the current flowing through said series coils without changing the resistance between the omnibus wire and the equalizing connection, substantially as described.

6. The method of individually regulating the compounding effect of one of the series coils of a number of dynamo electric generators feeding the same work circuit in multiple, which consists in inversely varying two resistances, one in series with said series coil and the other in shunt thereto, substantially as set forth.

7. The method of regulating a group of compound-wound electric generators feeding the same work circuit in multiple, consisting in simultaneously varying the current flowing through the series coils of said generators by changing the resistance of an alternative or derived circuit around all of said coils, substantially as described.

8. The method of regulating two or more compound-wound electric generators connected in multiple to the work circuit, consisting in separately varying the current flowing through the series field coils of said generators, without changing the total resistance between the terminals of said coils, and then varying the current flowing through all of said coils simultaneously, by changing the resistance of an alternative or derived circuit around said coils, in correspondence with the conditions of load, substantially as set forth.

9. The combination with a number of dynamo electric generators feeding the same work circuit in multiple, of one or more rheostats each one in series to the series coil of one of said generators, substantially as described.

10. The combination with a number of dynamo electric generators feeding the same work circuit in multiple, of two rheostats for each generator, one in series with its series coil and the other in shunt thereto, substantially as set forth.

In witness whereof I have hereunto set my hand this 3d day of February, 1893.

WALTER H. KNIGHT.

Witnesses:
JOHN W. GIBBONEY,
BENJAMIN B. HULL.